PRESSURE-RESPONSIVE RECORDING HAVING MAGNETICALLY BIASED MARKING MECHANISM

Filed Dec. 23, 1959 3 Sheets-Sheet 1

LEONARD K. SORGI
INVENTOR.

BY John J. Rogan
ATTORNEY

Dec. 1, 1964 L. K. SORGI 3,159,710

PRESSURE-RESPONSIVE RECORDING HAVING MAGNETICALLY BIASED MARKING MECHANISM

Filed Dec. 23, 1959 3 Sheets-Sheet 2

LEONARD K. SORGI
*INVENTOR.*

BY John J. Rogan
ATTORNEY

LEONARD K. SORGI
*INVENTOR.*

BY John J. Rogan
ATTORNEY

United States Patent Office 3,159,710

Patented Dec. 1, 1964

3,159,710

PRESSURE-RESPONSIVE RECORDING HAVING MAGNETICALLY BIASED MARKING MECHANISM

Leonard K. Sorgi, Scarsdale, N.Y., assignor, by mesne assignments, to Litton Systems, Inc., a corporation of Maryland Filed Dec. 23, 1959, Ser. No. 861,528

9 Claims. (Cl. 178—6.6)

This invention relates to recorders and more especially to the visual recording of subject matter represented by electric signals.

A principal object of the invention is to provide improved methods and apparatus for translating electric signals into visual recordings of which so-called "facsimile" records are typical.

Another principal object is to provide a novel method and apparatus for precisionally controlling the recording pressure of a recording member on a pressure-responsive blank whereby more precise and finely detailed records can be made.

A further object is to improve the mechanism and operation of a facsimile recorder employing pressure-responsive record blanks, whereby one or a multiplicity of recorded copies can be made simultaneously.

Various types of electrical recorders have been proposed heretofore and they may be classified into two general categories, namely those of the mechanical recording kind and those of the electrosensitive recording kind. The first category would include such devices wherein the recording mark is effected by the mechanical impact of a recording hammer or tool or by projecting a spray or column of marking fluid on to the recording surface. The second category would include such devices wherein the recording is effected by an electric current or discharge acting on or through the recording surface. The second category of recorders has the drawback that it is difficult to make more than one recorded copy at a time, although that type of recorder has the advantage of producing recorded copy of fine detail and over a relatively wide range of shade variations between black and white. The recorders of the first category have the advantage that a number of record copies can be simultaneously made, for example by using a plurality of record sheets which transfer the recording from sheet to sheet, for example by carbon paper or the like located between the various sheets. However, such recordings have not as great fineness of recording detail as those of the second category.

Accordingly one of the features of this invention is to provide a recording method and apparatus which combine the advantages of both the above categories of recorders.

Another feature relates to a novel arrangement for accurately controlling, over a wide range of values, the recording pressure of a recording element on a pressure-responsive recording surface.

Another feature relates to a recorder for electric signals, and employing a pressure-responsive surface which is acted upon by what may be termed a "free-floating" pressure device whose pressure on the said surface can be highly accurately controlled over a continuously wide range of values in response to received electric signals.

A further feature relates to a novel facsimile recorder of the intersecting edge kind, wherein one of the edges is in the form of a free-floating element arranged to be held continuously in contact with the recording surface so that substantially no marking is effected for a minimum level of received signal amplitude, and continuously graded markings can be produced over a wide range of received signal amplitudes beyond the minimum.

A further feature relates to an improved marking bar for so-called intersecting edge recorders wherein the bar can be maintained in continuous contact with the recording surface without producing undesired striated background in the recorded copy corresponding to the "spacing" or non-marking areas of the copy.

While, as pointed out hereinabove, mechanical type recorders have the advantage of being able to produce a number of recorded copies simultaneously, the marking unit or head has necessarily been of relatively large mass and weight. Furthermore, it was necessary, because of that weight, to space the bar from the recording surface corresponding to the non-marking or "spacing" intervals between marking signals. If not so spaced, the vibration and unavoidable variations in the surface configuration of the intersecting edge of the helix anvil carried by the scanning drum or platen, and also the unavoidable play in the mountings of the bar and its magnetic operating armature, cause undesirable striations or streakings in the recorded copy where no such markings should appear. That gives the finished recording an annoying streaked background. Furthermore, with the usual movable bar constructions the natural period of vibration of the movable system, including the bar and its associated actuating armature, in combination with the necessary linkages, usually cause the movable system to have a low natural period of vibration. To eliminate chatter, it has been necessary heretofore to damp the movable system with loading devices, such as springs or rubber contact members, but the loading generally absorbs more power than that required for the actual printing. The net result was that because of the mass of the moving system and recorder head, and because of the spacing required between the recording bar and record surface, as well as because of the necessary damping, the maximum recording speed was quite limited as compared with the other kinds of recorders. In addition, careful assembly and adjustments had to be made for satisfactory operation when replacing a recording element, and even during normal operation of the machine, in order to counteract the effects of wear and the like. These drawbacks in the mechanical category of recording apparatus of the prior art have hampered the use of that kind of equipment notwithstanding the advantages of inexpensive recording media and plural copy production.

One of the main objects of this invention, therefore, is to overcome the above noted draw-backs by constituting the marking element and the magnetically operated armature as a single element capable of high speed operation, and by eliminating all damping and loading devices such as a biasing spring or other biasing element which has heretofore been used to retain the marking element in its retracted or non-marking position. As a result of the invention, the effects of wear and the necessity for readjustment are minimized and the replacement of the marking element when necessary is simplified.

In accordance with the invention, the marking element is in the form of a member either wholly or partially of ferromagnetic material so that it can constitute an armature of an electromagnet and so that it has a marking edge or point adapted to apply signal control pressure to a recording surface. The said marking member preferably is maintained in contact with the recording surface, but the pressure can be so adjusted electromagnetically that the contact does not result in any markings on the record blank in the absence of received marking signals. The said marking member is in effect freely floating and in one form merely rests upon its support in such relation to the electromagnet that it freely slides or rolls towards and away from the marking position in response to the marking and spacing signals. It will be understood of course, that the marking member, instead of being in continuous contact with the recording surface may be slightly spaced therefrom when space signals are being received. In order to limit the recording to successive minute elemental areas of the record blank, a movable anvil or the like is arranged on the opposite side of the blank from the marking member to form intersecting edges which define a small contact point so that the location of that point with respect to the record surface can be synchronized with the successive elemental areas scanned by the corresponding facsimile transmitter.

A further feature of the invention relates to the novel organization, arrangement and relative location and interconnection of parts which cooperate to provide an improved facsimile recorder or the like. The invention is in the nature of an improvement on the kind of recorder disclosed in the prior patent of Austin G. Cooley, No. 3,138,426, dated June 23, 1964.

In the drawing which shows, by way of example, certain embodiments,

Figures 1, 1A:
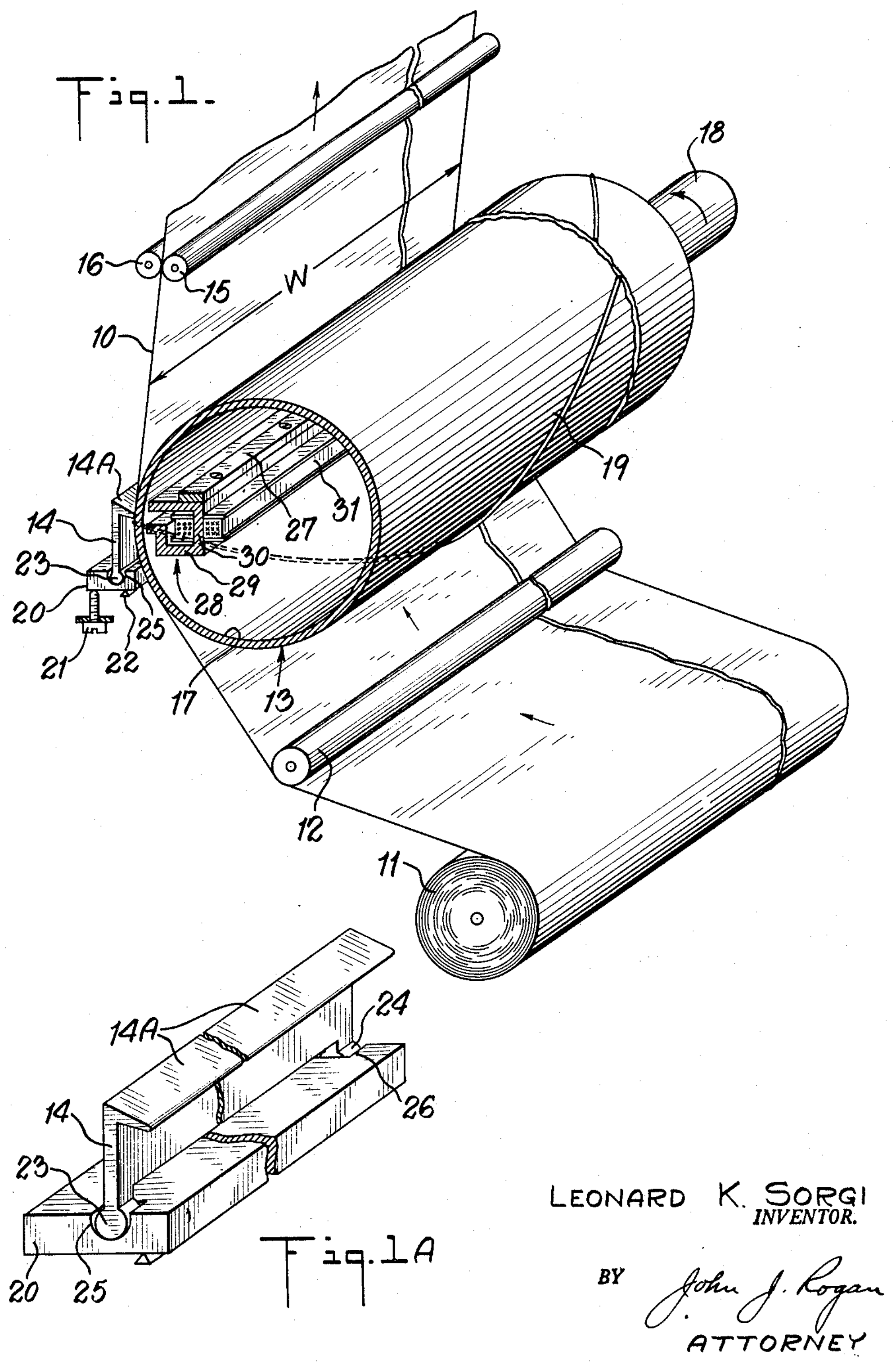
FIG. 1 is a perspective view of a recorder embodying principles of the invention.
FIG. 1A is a large perspective view of one form of mounting for the recording bar.
Figure 2:
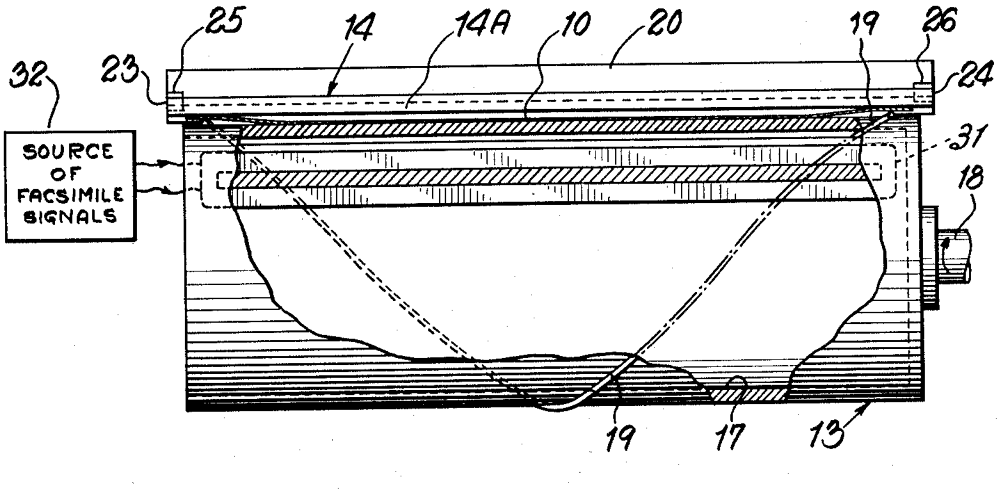
FIG. 2 is a top plan view, partly sectional, of the more important parts of the recorder of FIG. 1 illustrating the invention.

Referring to FIGS. 1 and 2, there are shown the more important parts of a facsimile recorder embodying the invention. The numeral 10 represents a web or sheet of recording material of any well known kind comprising for example a flexible backing of paper or other material having its surface provided with a pressure-responsive coating. Such coatings are well known in the recording art and are usually of a kind which normally is opaque or at least non-translucent, but when subjected to pressure in localized areas the coating at those areas becomes either transparent or translucent, or may even be entirely removed to expose the contrasting color of the backing, thus producing the desired visible recorded information. Typical examples of such pressure-responsive blanks are disclosed in Harold R. Dalton U.S. Patents No. 2,313,808 and 2,313,810.

It will be understood that the web or recording blank 10, instead of being a single sheet, may consist of two or more similar sheets, so that as they are simultaneously subjected to pressure at the recording areas, a similar record is produced simultaneously on all the sheets. In fact, if desired the sheet 10 may be a pressure-sensitive sheet and the remaining sheets may be of ordinary paper with interleaved sheets of conventional carbon transfer paper such as is ordinarily used in making carbon copies. Likewise, instead of the blank 10 being a sheet of paper with a pressure-sensitive surface, it may be a sheet of conventional carbon paper with the non-carbon side facing the marking member and with the carbon side in contact with a sheet of ordinary blank paper. Merely for simplicity in the drawing, the sheet 10 is shown as a single sheet of pressure-responsive paper.

The recording sheet or blank 10 can be reeled off from a supply roll 11 and around one or more idler rollers 12, and thence upwardly between the rotatable "scanner" 13 and the elongated recording bar 14. The paper blank may pass between a pair of paper feed rollers 15, 16 to a suitable receiving reel (not shown). The paper 10 is fed in the direction of the arrow in fixed time relation to the rate of rotation of the member 13 as is well known in the facsimile recording art. In accordance with one feature of the invention the forward edge 14A, which presses against the paper 10, is inclined or bent, for example, opposite to the direction of the paper travel. This bending of the forward edge also stiffens the recording bar 14 in the event it is made out of thin soft iron or other ferromagnetic stock.

The scanner 13 consists of a drum 17 or other suitable rotatable support of non-magnetic material, metal or plastic for example, and is open at one end for purposes to be described. The opposite end of the drum or rotatable support is provided with a shaft or spindle 18 which is arranged to be driven by any suitable motor (not shown). This same motor may be connected to the feed rollers 15 and 16 so as to feed the recording blank 10 in a timed relation to the rate of rotation of the drum 17. The surface of the drum 17 is provided with a helix rib 19 which is knife-edged or similarly small in cross-section and is arranged to have its apex intersection with the recording bar 14 in a minute elemental area. As shown more clearly in FIG. 2, the bar 14 extends parallel to the length of the scanner 13 so that the forward edge of the bar 14 intersects the helical rib 19 as the scanner 13 rotates. In the manner well known in the facsimile recording art, the paper feed is controlled in timed relation to the rotation of the scanner 13 so that the recording sheet 10 is scanned in successive spaced linear scanning lines and by reason of the intersecting relation between the linear edge of the recording bar 14 and the apex of the helix 19, each linear element is scanned in successive minute elemental areas.

In accordance with one phase of the invention, the recording bar 14 is supported in any well known anti-frictional manner so that the recording edge 14*a* can freely and unrestrainedly press against the blank 10 without using any biasing springs or the like to effect such pressure. The normal or "spacing" pressure corresponding to a "space" or non-marking signal, can be adjusted magnetically as will be described, and also by supporting the bar 14 for example on a block 20 which can be adjustably tilted for example by an adjusting screw 21 to tilt the block 20 around a fixed knife edge 22 or the like. This causes the bar 14 likewise to tilt towards the blank 10. The magnetic adjustment can be made by adjusting the normal "spacing" or non-marking current in the electro-magnet to control the biased pressure.

The bar 14 can have its lower edges at the ends thereof provided with rounded bearing members 23, 24, as shown more clearly in FIG. 1A, which bearing members seat in corresponding rounded recesses 25, 26 in the ends of block 20. While one particular manner of freely supporting the bar 14 is illustrated so that it is substantially free-floating, it will be understood that any other equivalent manner of anti-frictional support may be employed. Bar 14 is in the form of a slender, flat strip of magnetizable metal.

Extending interiorly of drum 17 is a rigid supporting bar 27 to which is fastened an elongated electromagnet 28 which extends along substantially the entire length of drum 17. The bar 27 can be anchored to any rigid part of the machine external of the drum 17 in any suitable manner. The magnet 28 is formed with a magnetic core 29 of generally U-shaped cross section having a yoke 30 around which is wound the elongated magnetizing winding 31, the direction of the winding for example being as indicated by the conventional directional winding symbols in the drawing. Thus, the winding 17 extends approximately the full length of the drum 17. The arms of the U-shaped core 29 extend forwardly towards the interior face of drum 17 from which they are spaced to permit the drum to rotate while the magnet 28 is stationary. Consequently, there is provided a magnetic gap between the edge 14A of the recording bar and the ends of the U-shaped core 29. It is through this gap that the recording blank 10 is fed.

In order to cause each successive linear element across the blank width "W" to be scanned in successive elemental spots, for example 0.01 inch by 0.01 inch, the drum 17 or rotatable support may be provided in the well known manner with the helical knife edge or rib 19. Consequently, as the drum 17 rotates, there is provided an elemental area defined by the intersection of rib 19 and the edge 14A. In accordance with the invention, the elongated magnetizing winding 31 is arranged to be energized from any suitable source of electric signals to be recorded, such for example as a source 32 of marking and spacing facsimile electric signals.

Consequently, as the winding 31 is variably energized, it causes a corresponding pressure to be exerted by the edge 14A on the blank 10 against the rib 19 which acts as an anvil and defines the elemental intersecting scanning area. The bar 14, therefore, constitutes in a single element a movable armature which extends the full width of the recording blank, and also in itself constitutes the pressure marking element for subjecting the blank 10 to the required recording pressure at each elemental area. It should be observed that apart from the magnetic effort resulting from the energization of winding 31, the bar 14 stays put, that is it is free from any biasing springs or the like. In any event the normal contact of the recording bar 14 against the blank is so light that it does not result in any markings on the blank for minimum or spacing signal currents applied to the winding 31. It will be understood, of course, that if the source 32 is a facsimile transmitting machine, the scanning element of that machine in the well known manner is operated in synchronized relation to the rotation of drum 17 so that the electric signals corresponding to each successive elemental area of the scanned subject matter at the transmitter are synchronized with the location of the corresponding scanned elemental area of the blank 10.

The foregoing described arrangement enables the received facsimile signals to precisely control the pressure of the edge of the recording bar 14 on the recording blank 10. This pressure may be varied between that necessary to produce no marking and that necessary to produce the heaviest or darkest marking so that the blank 10 can record continuous gradations of shade between white and black. When the facsimile signals are impressed on the winding 31, the recording bar 14 is urged against the surface of the blank 10, and therefore against the helical rib 19 acting as an anvil, to produce marking pressure of the desired value at the instantaneous scanned elemental area of the blank 10. When the facsimile signals are of zero or minimum amplitude corresponding to no marking, the pressure of the recording bar 14 on the blank 10 is relieved and no marking of that blank occurs. Normally the marking bar 14 remains in contact with the blank 10 at all times so that a definite minimum level of facsimile signals is required to produce a mark. In actual construction, the movement of the recording bar 14 may be only a fraction of a thousandth of an inch. Of course, if the recording is to be effected simultaneously on a series of stacked transfer sheets between the blank 10 and the scanner 13, a somewhat heavier pressure may be required, and also this pressure may be normally adjusted depending upon the hardness or pressure-responsive characteristics of the coating on the blank 10. By reason of the fact that the movement of the bar 14 is in any case a minute value, for example less than a thousandth of an inch, and since it can be made of thin, light-weight stock and is unrestrained in movement, the speed of recording on the blank 10 can be greatly increased over that obtainable with prior mechanical recorders of the helix-recording bar kind.

Figure 5:
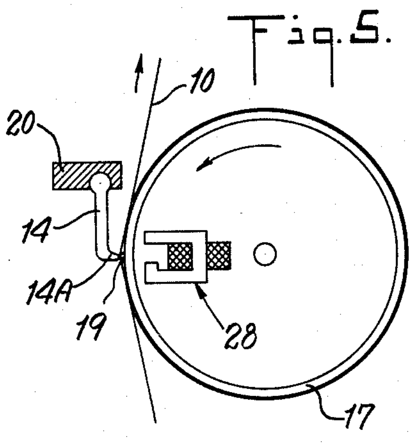

While in the embodiment of FIG. 1 and FIG. 2 the recording bar is supported at its lower edge with the recording edge 14A above the point of support, it will be understood that the reverse arrangement may be used as schematically illustrated in FIG. 5, wherein the recording bar 14 is suspended for anti-frictional tilting movement from the block 20.

It also will be understood that the particular manner of supporting the bar 14A shown in FIGS. 1 and 5 can be varied so as to achieve the ultimate in anti-friction or free-floating effect. Thus, as shown in FIG. 6, the bar 14 may merely slide on the surface of the slightly inclined fixed bearing 20 so that it moves in a slightly inclined direction towards the blank 10.

Likewise, instead of making the edge 14A of the bar longitudinally rigid, it may be made of flexible stock in the manner described in the patent to Austin G. Cooley, above referred to.

Figure 3:
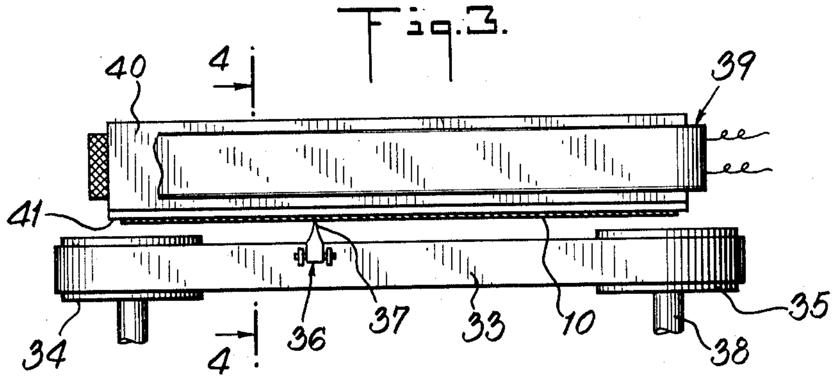
FIG. 3 is a top plan view of a modification of the recorder of FIGS. 1 and 2.
Figure 4:
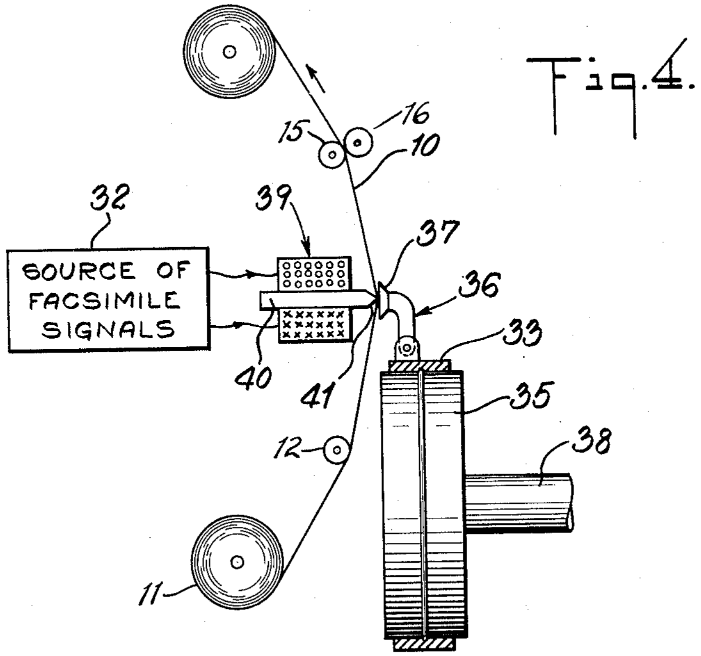
FIG. 4 is a sectional view of FIG. 3 taken along the line 4—4 thereof.
Figure 6:
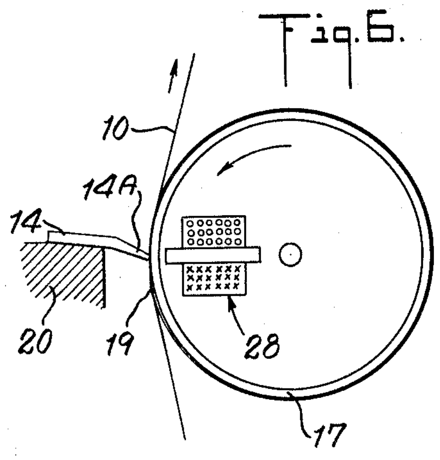
FIGS. 5 and 6 are respective schematic representations of modifications of FIGS. 1 to 4.

It will be understood that the invention is not limited to the particular kind of intersection bar-anvil recorder shown in FIGS. 1, 5 and 6. For example, there is shown in FIGS. 3 and 4 a facsimile recorder of the endless moving band kind, disclosed in U.S. Letters Patent No. 2,717,822 to Austin G. Cooley. This metal band 33 extends around a pair of pulleys 34, 35, and the band carries one or more pressure marking elements 36 which are anchored for anti-frictional swinging movement on the band 33. Each of these elements has a forward recording edge 37 which edge extends parallel to the length of the blank 10. One of the pulleys, for example pulley 35, has its shaft 38 connected to a suitable source of synchronous driving power (not shown) for moving the pressure marking element 36 at the required synchronized speed across the width of the recording blank 10. For a detailed description of one preferred manner of driving the band 33 and the pressure marking element 36 at the required precise synchronous speed, reference may be had to U.S. Letters Patent No. 2,643,173 and No. 2,643,174 granted to Austin G. Cooley. Cooperating with the member 36 and fixedly mounted on the opposite side of the blank 10 is an elongated electromagnet 39 which may be similar to the magnet 28 of FIG. 1 in construction, the winding of which is arranged to be energized from the source 32 of facsimile electric signals. The core 40 of the electromagnet is in the form of an elongated flat ferromagnetic bar having a knife-edge 41 extending across the width of blank 10 and against which the blank is held, for example by offsetting of the roll 11. The member 36 has its recording pressure edge in the form of a knife edge 37 at an intersecting angle with edge 41. Here again the member 36, while it normally rests lightly against the pressure responsive coating on blank 10, does not exert sufficient pressure to produce a visible mark until the elongated electromagnet 39 is energized by facsimile signals.

Other changes and modifications may be made in the disclosed embodiments without departing from the spirit and scope of the invention. For example while in the preferred form the marking member takes the form of an elongated element extending substantially across the width of the recording blank, it may take the form of a rod or a thin light-weight sleeve, the surface of which carries a raised helix rib similar to the rib 19, and this sleeve can be rotated in synchronized relation with the rotation of drum 17. In general, the marking member can be any light-weight element which is constituted of, in whole or in part, a ferromagnetic material which can be acted upon by the electromagnet to press the marking member against the recording surface in cooperation with an anvil member on the opposite side of the recording surface. But in any case the marking member is, in accordance with the invention, supported in an unrestrained or floating manner so that its position and pressure, with respect to the recording blank, can be adjusted for initial bias and marking pressures by suitable energization of the electromagnet cooperating therewith.

Features disclosed herein but not claimed are claimed in the patents to Austin G. Cooley, No. 3,138,426 and Herbert S. Stein, et al., No. 3,138,427, granted June 23, 1964.

What is claimed is:

1. A signal-controlled marking mechanism for electric signal recorders and the like, comprising a pair of members defining pressure jaws of elemental pressure area and between which a recording blank is arranged to be moved, one of said jaws being a backing anvil and the other being a recording bar, a signal energized electromagnet whose movable armature is constituted of said bar, pivotal means supporting said bar for adjustable tilting pressure against one face of the blank, and means supporting said electromagnet adjacent the opposite face of the blank, the said bar being supported for substantially unrestrained tilting motion towards said blank under control of the energization of said electromagnet.

2. A signal-controlled marking mechanism according to claim 1 in which said bar is in the form of an elongated magnetizable strip which extends across substantially the entire recording width of said blank.

3. A signal-controlled marking mechanism according to claim 1 in which said bar is in the form of a magnetizable strip which extends across substantially the entire recording width of said blank, and said electromagnet defines an elongated magnetic field in substantial alignment with the edge of said strip.

4. A facsimile recorder comprising a recording blank-scanning member having an anvil, a cooperating marking element having a rectilinear edge of magnetic material which intersects said anvil to define an elemental blank-marking spot, means to produce relative movement between said anvil and marking element to scan said blank in a transverse linear strip made up of successive elemental spots defined by said intersection, an electromagnet having means to produce a substantially uniform and elongated magnetic field extending across substantially the entire recording width of the blank, which field is in substantial parallelism with the scanned linear strip for moving said marking element into signal-controlled pressure against the blank, said electromagnet and said marking element being located respectively adjacent opposite faces of the blank with the electromagnet supported on the side of the blank opposite to that on which the recording takes place.

5. A facsimile recorder according to claim 4 in which said electromagnet extends substantially the recording width of the blank, and said anvil is in the form of a helical rib on a rotary non-magnetic drum.

6. A facsimile recorder according to claim 4 in which said electromagnet extends substantially across the recording width of the blank, and said anvil is constituted of the edge of a corresponding elongated stationary core of said electromagnet, and said marking element is attached to an endless band carrier which is moved in successive linear traverses across said blank.

7. A facsimile recorder comprising a rotatable scanning drum having a helical ridge, an electromagnet stationarily mounted within said drum having a core which extends substantially along the entire length of the drum covered by said ridge, a signal energized winding around the length of said core and also extending along the length thereof to define a substantial linear magnetizing field extending along the drum, means to hold the record blank in contact with said ridge, means to move said drum and blank in predetermined timed relation whereby said ridge sweeps across the blank in successive transverse linear strips, an armature for said electromagnet also extending along the length of the drum, and means supporting said armature for substantially free tilting motion externally of said drum to exert substantially unrestrained controlled pressure contact with the recording face of the blank in response to energizations of said electromagnet.

8. A signal-controlled marking mechanism for electric signal recorders and the like, comprising a pair of members defining pressure jaws of elemental area and between which a recording blank is arranged to be moved, one of said members being a backing anvil and the other being a blank-contacting element which presses against the blank for recording, a stationary magnetic core defining an elongated magnetic gap extending parallel to the surface of the blank which gap is spaced from said backing anvil and said blank contacting member, a magnetic armature carrying said blank-contact element, means mounting said armature for free and substantially unrestrained tilting movement with respect to said gap, and a magnetizing winding for said core and arranged to be energized by recording signals and thereby to cause said blank-contacting element to subject said blank to signal controlled pressure at each elemental recording point.

9. A signal-controlled marking mechanism for marking a recording blank, comprising a pair of relatively movable spaced ferromagnetic members between which the blank is moved, one of said members being an elongated member which extends substantially across the entire width of the blank and is fixedly mounted adjacent one face of the blank, a magnetizing winding surrounding said elongated member longitudinally, means supporting the other of said pair of members for movement towards the first member, means including said winding to subject said members to a magnetic field actuating the movable armature constituted by said other member, and scanning means to confine the pressure exerted on the recording blank by said other member to successive elemental areas of the blank, said scanning means including a rotatable drum of non-magnetic material having a helical raised rib adjacent one face of said blank, the magnetic structure including said winding being mounted inside said rotatable drum.

References Cited in the file of this patent

UNITED STATES PATENTS

| | | |
|---|---|---|
| 848,329 | Vawter | Mar. 26, 1907 |
| 1,298,701 | Harrington | Apr. 1, 1909 |
| 2,484,298 | Krahulec | Oct. 11, 1949 |
| 2,785,039 | Artzt | Mar. 12, 1957 |
| 2,906,582 | Page | Sept. 29, 1959 |